(12) United States Patent
Guttau et al.

(10) Patent No.: US 8,819,875 B2
(45) Date of Patent: Sep. 2, 2014

(54) COMBINED BIDET-TOILET ASSEMBLY FOR AIRCRAFT

(75) Inventors: Simone Guttau, Buxtehude (DE); Christiane Lindauer, Hamburg (DE); Klaus-Udo Freitag, Artlenburg (DE)

(73) Assignee: Airbus Operations GmbH, Hamburg (DE)

( * ) Notice: Subject to any disclaimer, the term of this patent is extended or adjusted under 35 U.S.C. 154(b) by 525 days.

(21) Appl. No.: 12/726,108

(22) Filed: Mar. 17, 2010

(65) Prior Publication Data

US 2010/0235978 A1 Sep. 23, 2010

Related U.S. Application Data

(60) Provisional application No. 61/160,794, filed on Mar. 17, 2009.

(30) Foreign Application Priority Data

Mar. 17, 2009 (DE) .......................... 10 2009 013 558

(51) Int. Cl.
| | |
|---|---|
| A47K 3/20 | (2006.01) |
| E03D 9/08 | (2006.01) |
| B63J 4/00 | (2006.01) |
| B64D 11/02 | (2006.01) |
| B61D 35/00 | (2006.01) |

(52) U.S. Cl.
CPC ............... B61D 35/005 (2013.01); B63J 4/006 (2013.01); B64D 11/02 (2013.01); E03D 9/08 (2013.01)
USPC .......................................................... 4/420.4

(58) Field of Classification Search
CPC ....................................................... B64D 11/02
USPC ................................ 4/420.1–420.5, 443–448
See application file for complete search history.

(56) References Cited

U.S. PATENT DOCUMENTS 4,521,925 A  6/1985 Chen et al.
4,668,227 A *  5/1987 Kay .............................. 604/289
(Continued)

FOREIGN PATENT DOCUMENTS

| DE | 10 2005 059 552 A1 | 6/2007 |
|---|---|---|
| DE | 102007013949 A1 | 9/2008 |
| DE | 102007031903 A1 | 1/2009 |
| JP | 2008-285838 A | 11/2008 |

(Continued)

OTHER PUBLICATIONS

German Office Action for DE 10 2009 013 558.8-22 mailed Mar. 16, 2009.

*Primary Examiner* — Huyen Le
*Assistant Examiner* — Janie Christiansen
(74) *Attorney, Agent, or Firm* — Ingrassia Fisher & Lorenz, P.C.

(57) ABSTRACT

A combined bidet and toilet system is provided for a toilet in transportation having a spray nozzle and a flow rate restrictor. The spray nozzle is adapted to provide a water supply to clean a user on the toilet. The flow rate restrictor is adapted to regulate the water supply on the basis of a water flow rate through the spray nozzle. The spray nozzle is adapted so that it is extensible on the toilet for use.

14 Claims, 3 Drawing Sheets

(56) References Cited

U.S. PATENT DOCUMENTS

| | | | |
|---|---|---|---|
| 5,305,792 A * | 4/1994 | Ellgoth et al. | 137/899.2 |
| 5,666,672 A * | 9/1997 | Birsel et al. | 4/236 |
| 5,732,417 A * | 3/1998 | Pondelick et al. | 4/427 |
| 5,970,528 A * | 10/1999 | Shirai et al. | 4/420.2 |
| 7,428,758 B2 * | 9/2008 | Park | 4/420.2 |
| 2008/0237397 A1 | 10/2008 | Seibt | |

FOREIGN PATENT DOCUMENTS

| | | |
|---|---|---|
| WO | 2008128952 A1 | 10/2008 |
| WO | 2008140105 A1 | 11/2008 |

* cited by examiner

COMBINED BIDET-TOILET ASSEMBLY FOR AIRCRAFT

REFERENCE TO RELATED APPLICATIONS

This application claims the benefit of the filing date of German Patent Application No. 102009013558.8 filed on Mar. 17, 2009 and of U.S. Provisional Patent Application No. 61/160,794 filed on Mar. 17, 2009, the disclosure of which applications is hereby incorporated herein by reference.

TECHNICAL FIELD

The invention relates to sanitary devices in means of transportation. In particular, the invention relates to a combined bidet and toilet system for a toilet in a means of transportation. Furthermore, the invention relates to a means of transportation having a toilet monument, which has a combined bidet and toilet system for a toilet and a method for supplying a combined bidet and toilet system in a means of transportation with water and for removing wastewater from the system.

BACKGROUND

Currently, vacuum wastewater systems are used in passenger aircraft. For this purpose, the feces are transported from the toilet bowl via pipelines using an air flow, which may result from the differential pressure between outside air and cabin air in flight. These feces are then collected in so-called vacuum tanks (wastewater collection tanks). Because the differential pressure on board between outside air and cabin air may be too low for a delivery flow and/or may not be present at all in the event of low altitudes or service times on the ground, the wastewater collection tank may be evacuated using a vacuum generator, the "blower", to build up a differential pressure. The vacuum wastewater system can be connected to a controller. The controller controls the system and allows the data exchange between the system and the aircraft.

A flushing device for a vacuum toilet having a nozzle configuration is known from DE 10 2007 031 903 A1. DE 10 2007 013 949 A1 discloses a flushing configuration and a method for vacuum toilets, wherein a partial vacuum generated for suctioning feces is also used to generate a desired flushing medium flow. A vacuum toilet system for transporting toilet wastewater and for collecting the wastewater in an aircraft is known from WO 2008/128952 A1.

SUMMARY

It may be desirable to have a light and flexible system for cleaning a user in a means of transportation.

A combined bidet and toilet system for a toilet in a means of transportation, a means of transportation having a toilet monument, which has the system, and a method for supplying a combined bidet and toilet system in a means of transportation with water and for removing wastewater from the system are specified according to the features of the independent claims.

According to one exemplary embodiment of the invention, a combined bidet and toilet system for a toilet in a means of transportation, such as, for example, an aircraft is disclosed, the system having a spray nozzle and a flow rate restrictor. The spray nozzle is implemented to provide a water supply for cleaning a user on the toilet. The flow rate restrictor is implemented to regulate the water supply based on a water flow rate through the spray nozzle.

The means of transportation is an aircraft, such as an airplane, a helicopter, or a zeppelin, or a rail vehicle, a water vehicle, or a road vehicle.

A system of this type may allow a regulation of the use of the bidet toilet, in that the flow rate resistance regulates the water flow rate through the spray nozzle and thus considers limited availability of fresh water on board a means of transportation.

A system of this type may allow an existing toilet interface to be used for integrating the bidet toilet unit. Furthermore, a bidet function may be integrated with an already existing vacuum toilet in the aircraft. A combined bidet toilet system of this type, for airplanes, for example, may correspond to the comfort of the bidet toilets in household use in consideration of the adaptation capability to a vacuum toilet and the additional requirements on airplane devices. In other words, the bidet toilet system may appear like a toilet unit and have corresponding interfaces. The bidet function is already integrated in a toilet system and does not have to be implemented in the toilet system if desired.

A system of this type may allow the system as a whole to be executable having a light weight and to be implemented as integratable in a washroom in a means of transportation.

A system of this type may allow a limited current supply and a varying voltage supply in a means of transportation to suffice for supplying the system with power.

According to a further exemplary embodiment of the invention, the system has a control unit, the control unit being implemented to control or regulate a usage number or usage frequency of the spray nozzle by the user. A system of this type having a control unit allows the water consumption due to the use of the bidet by the user to be limited.

According to a further exemplary embodiment of the invention, the system has a wastewater collection tank, the wastewater collection tank being implemented to receive wastewater from the toilet, the control unit being implemented to control or regulate a function of the spray nozzle based on a fill level of the wastewater collection tank.

A system of this type having a wastewater collection tank may allow the receiving capacity of the wastewater collection tank to be able to be controlled or regulated, for example, so that in case of a relatively high fill level in the wastewater collection tank, a bidet function can be deactivated without the toilet function being influenced.

According to a further exemplary embodiment of the invention, the control unit is implemented for the independent control and/or regulation of a function of the spray nozzle and a toilet function.

According to a further exemplary embodiment of the invention, the system has a flushing device for the toilet, the flushing device being implemented to automatically flush in the event of danger of overflow of the toilet.

According to a further exemplary embodiment of the invention, the system has a drainage device, the system being implemented for self-draining by the drainage device. "Self-draining" is to be understood for this purpose as draining performed automatically by the system, without a user intervention being necessary. In particular, this means that upon deactivation of the freshwater system, the freshwater supply can empty the water contained in this system component into the toilet and/or can automatically drain contained water back into the freshwater system. Damage of the device can thus be prevented in the event of cold temperatures, and all freshwater-conducting parts can be drained from time to time because of hygienic conditions.

According to a further exemplary embodiment of the invention, the system for self-draining by the drainage device is executed by gravity.

According to a further exemplary embodiment of the invention, the system has a ventilation unit, the system being implemented for self-ventilation by the ventilation unit. The freshwater line can automatically be ventilated upon drop of the freshwater pressure via a valve without water passage (air-no-water valve), for example. A drainage of the devices of the system can thus be ensured.

According to a further exemplary embodiment of the invention, the control unit is implemented to automatically initiate a ventilation by the ventilation unit.

According to a further exemplary embodiment of the invention, the spray nozzle is implemented for self-cleaning. The self-cleaning is performed, for example, by spraying out the nozzle after specific time intervals or via a separate trigger or by flushing of the nozzle after each use. The self-cleaning can either be performed using water or a special cleaning solution for this purpose. This may also be performed in a special housing associated with the nozzle, for example.

A system of this type having a self-cleaning spray nozzle may allow contamination to be prevented during the use of the spray nozzle.

According to a further exemplary embodiment of the invention, the system is adapted for self-cleaning or for disinfecting by using a freshwater system. The system may be implemented for self-cleaning or disinfection using a flushing water system or a cleaning solution system.

A system of this type may allow appropriate hygiene restrictions to be maintained on board airplanes, for sample. With a system of this type, the transmission of bacteria to a user may be minimized by the self-cleaning of the nozzle and its ability to be disinfected, for example.

In a system of this type, contamination of the system can be effectively prevented via the possibility of integration of a movable nozzle, which is only extensible upon use, for example.

According to a further exemplary embodiment of the invention, the system has a mechanical interface and an electrical interface, the mechanical interface and the electrical interface being implemented for connecting the system to a washroom of a means of transportation.

A system of this type may allow existing washrooms to be able to be easily equipped with a system of this type and/or allows faulty systems in the washroom to be able to be replaced easily.

According to a further exemplary embodiment of the invention, the system has a heating unit and a mixing unit. The heating unit is implemented for heating a quantity of water of the water supply for the spray nozzle to a temperature of at least approximately 55° C., for example, to a temperature between approximately 55° C. and approximately 65° C., the mixing unit being implemented to supply a specific quantity of water on the basis of a temperature of the heated quantity of water to produce a specific temperature for the water supply of the spray nozzle.

A system of this type having a heating unit allows the water of the water supply to be heated so that growth of bacteria in the system is minimized or even prevented entirely.

The system is set up so that the mixing device mixes the hot water from the heater automatically with colder water from a drinking water facility to a body temperature of approximately 38° C.

According to a further exemplary embodiment of the invention, the usage of the spray nozzle is deactivated because of a functional independence between the toilet function and the bidet function upon occurrence of an error.

According to a further exemplary embodiment of the invention, a possible overflow of the toilet due to a faulty valve, for example, is prevented by the integration of auxiliary functions, such as automatic flushing.

According to a further exemplary embodiment of the invention, burning of the user with hot water is prevented by an implementation of safety functions. This scalding protection can be performed mechanically (for example, using bimetals) or electrically via a temperature acquisition and shutoff of the bidet function upon exceeding the defined maximum temperature.

According to a further exemplary embodiment of the invention, the system has a temperature sensor for determining a water temperature of the water supply of the spray nozzle and the water valve, which regulates the water supply of the spray nozzle, so that water can go through the spray nozzle in the toilet at a specific temperature upon opening of a water valve.

According to a further exemplary embodiment of the invention, the spray nozzle is retractable and extensible for use in the toilet, and a water flow of the spray nozzle can be provided for a settable period of time of approximately five to ten seconds.

According to a further exemplary embodiment of the invention, the flow rate quantity of the water in the spray nozzle may be controlled in a specific pressure range by a flow rate restrictor.

According to a further exemplary embodiment of the invention, a user may reactivate the bidet function or the use of the spray nozzle via a bidet switch at least once, even if the regulator of the system has deactivated the spray nozzle.

According to a further exemplary embodiment of the invention, the nozzle is implemented to automatically retract into the toilet bowl after the closing of the water valve.

According to a further exemplary embodiment of the invention, the system has a toilet seat, the toilet seat being implemented as a heatable toilet seat.

According to a further exemplary embodiment of the invention, the toilet seat is implemented for self-cleaning of the toilet seat after a usage by a user.

According to a further exemplary embodiment of the invention, the toilet seat is implemented as a self-closing toilet seat.

According to a further exemplary embodiment of the invention, the toilet seat is implemented as a combination of a self-cleaning toilet seat, a self-closing toilet seat, and a heatable toilet seat.

According to a further exemplary embodiment of the invention, the system has an air dryer, which is implemented as combinable with the system. The system may have hot air supply after cleaning, so that toilet paper is no longer necessary for cleaning and drying, for example.

According to a further exemplary embodiment, the spray nozzle is implemented to provide a water jet, which cannot spray over the bowl edge of the toilet, and/or cannot hit outside the toilet.

According to a further exemplary embodiment of the invention, the system is implemented to be exchanged with a toilet unit, in particular a toilet unit in an aircraft.

According to a further exemplary embodiment of the invention, the system has a water management unit, the water management unit being implemented as integrated in the system to perform water management, for example, in connection with the control unit.

According to a further exemplary embodiment of the invention, all parameters of the system with respect to temperature, water jet, and time settings are implemented as variable.

According to a further exemplary embodiment of the invention, a means of transportation having a toilet monument which has a system according to one of the preceding exemplary embodiments of the invention is specified. A means of transportation of this type having the system allows a combined bidet toilet system to be able to be integrated in the airplane without great additional weight of an existing toilet system in a washroom of a means of transportation.

According to a further exemplary embodiment of the invention, a method is specified for supplying a combined bidet and toilet system in a means of transportation with water and for removing wastewater from the system, having a first step of providing a water supply for cleaning a user by a spray nozzle attached to a toilet and a second step of regulating the water supply on the basis of a water flow rate through the spray nozzle by a flow rate restrictor.

According to a further exemplary embodiment of the invention, the method also comprises the regulation of a usage number or usage frequency of the spray nozzle by the user by a control unit.

According to a further exemplary embodiment of the invention, the method also comprises the receiving of wastewater from the toilet by a wastewater collection tank and the regulation of a function of the spray nozzle on the basis of a fill level of the wastewater collection tank by the control unit.

The individual features of the various exemplary embodiments may also be combined with one another, whereby advantageous effects may also partially result, which go beyond the sum of the individual effects, even if they are not expressly described.

In particular, it is to be noted that the features described here and hereafter in respect to the system may also be implemented in the means of transportation and in the method and vice versa.

BRIEF DESCRIPTION OF THE DRAWINGS

The present invention will hereinafter be described in conjunction with the following drawing figures, wherein like numerals denote like elements.

DETAILED DESCRIPTION

Figure 1:
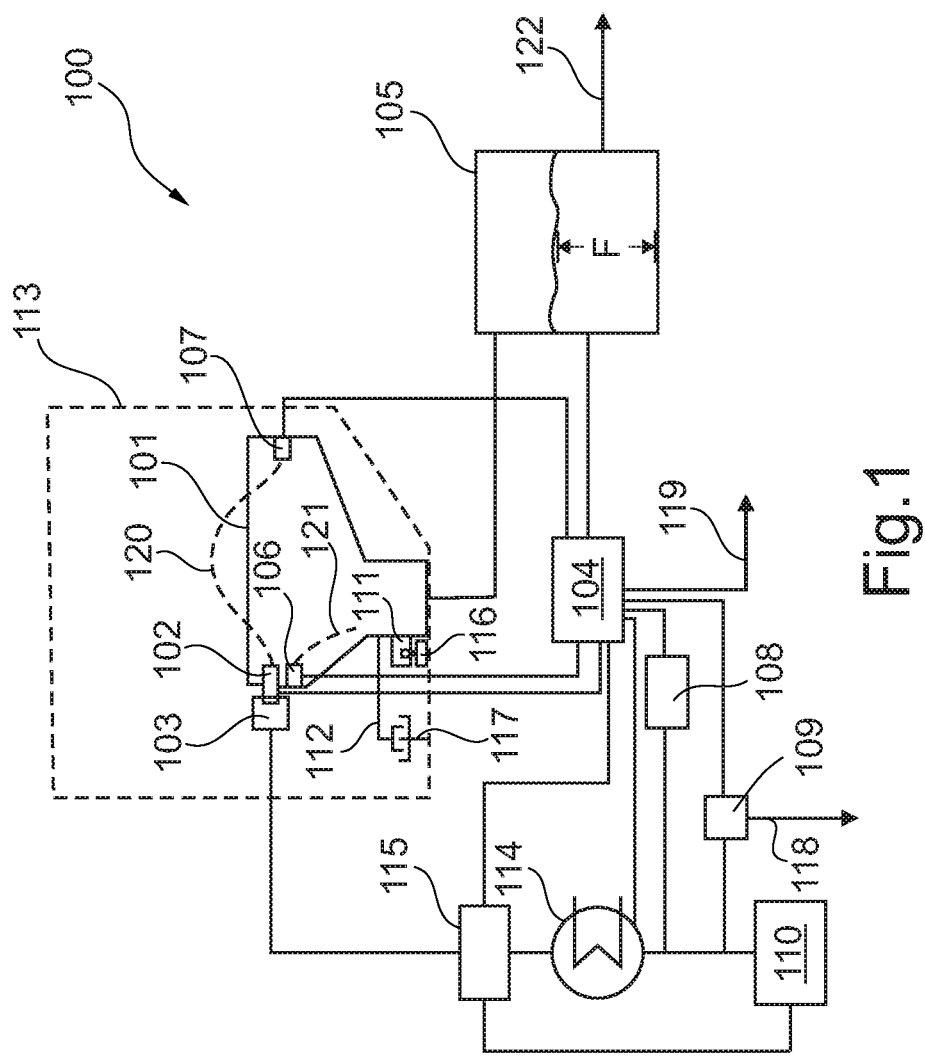
FIG. 1 shows a schematic illustration of a combined bidet and toilet system of the toilet in a means of transportation according to an exemplary embodiment of the invention.

The following detailed description is merely exemplary in nature and is not intended to limit application and uses. Furthermore, there is no intention to be bound by any theory presented in the preceding background or summary or the following detailed description. In addition, the illustrations in the figures are schematic and are not to scale. Identical reference numerals are used for identical or similar elements in the following description of the figures.

FIG. 1 shows a combined bidet and toilet system 100 for a toilet 101 in a means of transportation having a spray nozzle 102 and a flow rate restrictor 103.

The basic equipment of the combined bidet and toilet system 100 includes a nozzle 102, which extends movably under the toilet seat and sprays water. The operation is typically performed using a separate controller, which is fastened laterally on the toilet 101 or on the wall. The nozzle 102 can have a self-cleaning function, which is activated before and after each use. The toilet 101 having bidet function can also have the capability of regulating the water pressure of the cleaning jet as individually desired or influencing the shape and type of the jet. The water temperature may also be regulated to a preferred jet temperature (approximately body temperature).

The spray nozzle 102 is situated to provide a water supply for cleaning a user on the toilet 101. The flow rate restrictor 103 is attached to the spray nozzle 102 to regulate the water supply of the spray nozzle 102. The regulation can be performed in that the water flow rate through the spray nozzle 102 is measured and adjusted appropriately.

The spray nozzle 102 can provide a water jet 120, which cannot spray over the basin edge of the toilet 101, on demand.

The spray nozzle 102 and the flow rate restrictor 103 are connected via lines to a control unit 104, which is implemented to regulate a usage number or usage frequency of the spray nozzle 102 by the user. The toilet 101 is connected via a line to a wastewater collection tank 105 for receiving wastewater from the toilet 101. The control unit 104, which is connected to the wastewater collection tank 105, regulates a function of the spray nozzle 102 on the basis of a fill level F of the wastewater collection tank 105.

The wastewater collection tank is connected to the overall wastewater system 122 of the means of transportation.

The control unit 104 is further implemented having the independent control or regulation of a toilet function 106. The toilet function can provide the output of a water jet 121. The system 100 also has a flushing device 107 for the toilet 101, which is attached to the toilet 101, is connected to the control unit 104, and is implemented for automatic flushing in the event of danger of overflow of the toilet 101. In the event of an overflow of the toilet 101, the overflow of the toilet can be prevented by automatic flushing by the flushing device 107 with the aid of a level sensor, for example.

The system 100 also has a drainage device 108, which is connected to the freshwater system 110. With the aid of the drainage device 108, the freshwater supply can empty the water in the toilet 101 contained in the system 100 and/or drain contained water automatically back into the freshwater system 110 upon a deactivation of the freshwater system 110. The system 100 is implemented for self-draining by the drainage device 108, the drainage device 108 being connected to the control unit 104. The system 100 can be implemented for self-draining by the drainage device 108 by gravity.

A ventilation unit 109 is connected to the freshwater system 110, the system 100 being implemented for self-ventilation by the ventilation unit 109. The ventilation unit 109 can be connected to the overall ventilation system 118 of a means of transportation. The control unit 104 can be implemented for the automatic initiation of ventilation by the ventilation unit 109. The freshwater line ventilates automatically in the event of drop of the freshwater pressure, in order to ensure drainage of the devices of the system.

The spray nozzle 102 is implemented for self-cleaning, while the system 100 is implemented for self-cleaning or self-disinfecting using a freshwater system 110.

The system 100 also has a mechanical interface 111 and an electrical interface 112, the mechanical interface 111 and the electrical interface 112 being implemented for connecting the system 100 to a washroom 113 of a means of transportation using a matching mechanical interface 116 of the washroom 113 and a matching electrical interface 117 of the washroom 113.

The control unit 104 is connected using an electrical interface to the aircraft 119. The freshwater system 110 supplies a heating unit 114, which is controllable via the control unit 104 and is implemented for heating the water supply of the spray nozzle 102 to a temperature of approximately 55° C. to approximately 65° C. to minimize growth of bacteria in the system 100. The freshwater system 110 also has a mixing unit 115 having water, the mixing unit 115 being controllable via the control unit 104 and being implemented to supply a specific quantity of water on the basis of a temperature of the quantity of water heated by the heating unit 114 to produce a specific temperature for the water supply of the spray nozzle 102. The mixing unit 115 is connected via a line to the flow rate restrictor 103 and supplies the spray nozzle 102 with water.

Figure 2:
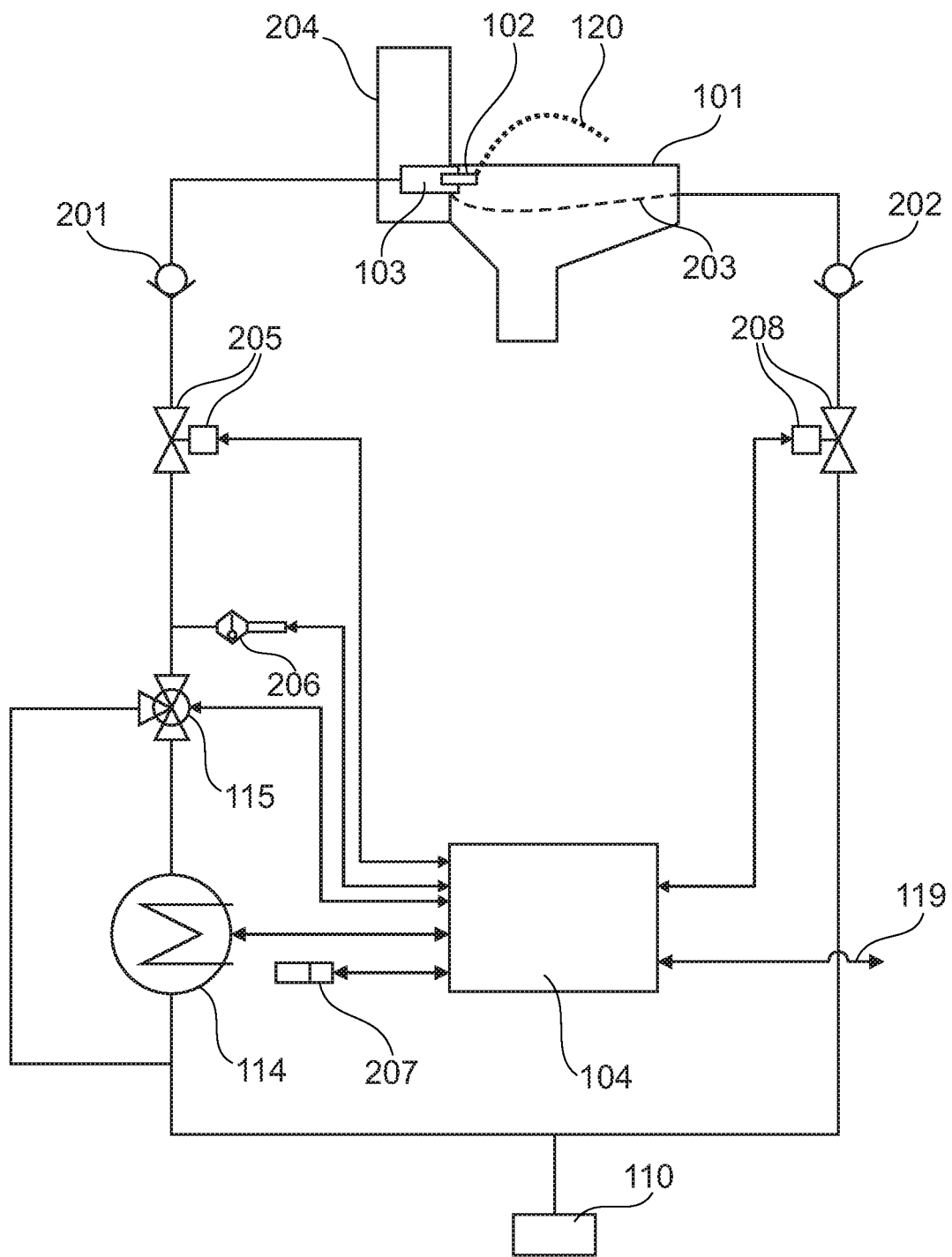
FIG. 2 shows a schematic illustration of a combined bidet and toilet system for a toilet in a means of transportation according to a further exemplary embodiment of the invention.

FIG. 2 shows a combined bidet and toilet system 100 having elements known from FIG. 1, which execute functions known from FIG. 1, namely a spray nozzle 102, a flow rate restrictor 103, a water jet 120, a toilet 101, a control unit 104, a heating unit 114, a mixing unit 115, a freshwater supply 110, and an electrical interface to an airplane 119.

Furthermore, FIG. 2 shows a bidet switch 207, via which a user can reactivate the function of the spray nozzle 102 and/or the bidet function at least one time after use. The bidet switch 207 is connected to the control unit 104. If the bidet function or the function of the spray nozzle is activated via the bidet switch 207, a temperature sensor 206 on the mixing unit 115 measures a water temperature in the range from approximately 35° C. to approximately 40° C., so that a water valve 205 opens and the water reaches the toilet via the spray nozzle 102 through a check valve 201, which prevents contamination of the freshwater system 110 by dirty water from the toilet. The spray nozzle 102 simultaneously extends for use, and the water flow 120 lasts for a settable period of time of five to ten seconds. The flow rate quantity of the water is controlled by the flow rate restrictor 103 in the specified pressure range. After the closing of the water valve 205, the nozzle 102 retracts automatically into the bowl of the toilet 101. A flow rate restrictor loop 204 is connected to the flow rate restrictor 103.

The toilet 101 also has a spray ring 203, which is schematically shown by a flushing level inside the toilet 101. The water supply of the spray ring 203 is activated during the flushing procedure and is made possible by flushing. The water for the flushing reaches the toilet 101 from the freshwater system 110 via a water valve 208, which is controllable by the control unit 104, via a check valve 202 having a function having an air bridge for separating the freshwater system and the wastewater system, which prevents contamination of the freshwater system 110 by the toilet 101. The spray ring 203 implements the supply of water for flushing the toilet.

Figure 3:
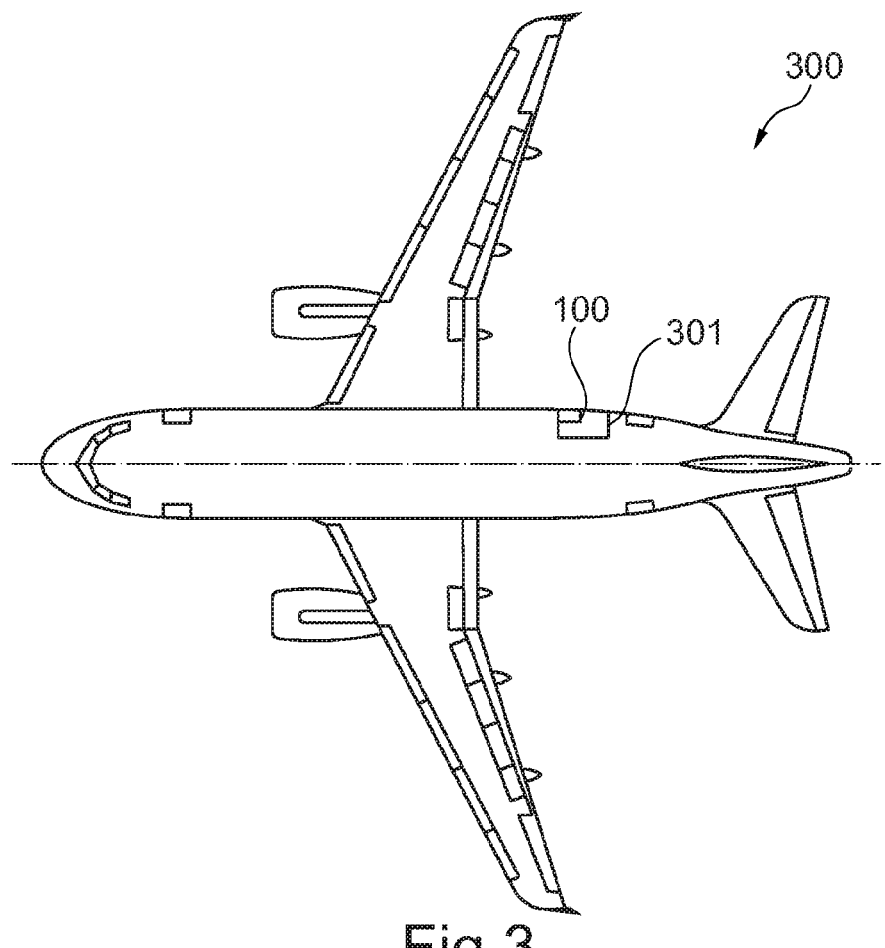
FIG. 3 shows a schematic illustration of a means of transportation having a toilet monument, which has a combined bidet and toilet system for a toilet in the means of transportation, according to an exemplary embodiment of the invention.

FIG. 3 shows a means of transportation 300 having a toilet monument 301, which comprises a system 100.

Figure 4:
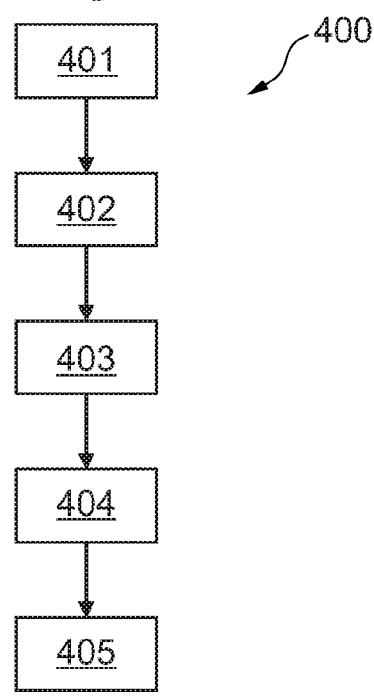
FIG. 4 shows a flowchart of a method for supplying a combined bidet and toilet system in a means of transportation with water and for removing wastewater from the system according to an exemplary embodiment of the invention.

FIG. 4 shows a flowchart of a method 400 for supplying a combined bidet and toilet system in a means of transportation with water and for removing wastewater from the system.

The method 400 comprises the following steps: in step 401, a water supply is provided for cleaning a user through a spray nozzle attached to the toilet. In step 402, the water supply is regulated on the basis of a water flow rate through the spray nozzle by a flow rate restrictor. In a further step 403, a usage number or usage frequency of the spray nozzle by the user is regulated by a control unit. In step 404, wastewater from the toilet is received by wastewater collection tank. In a last step 405, a function of the spray nozzle is regulated by the control unit on the basis of a fill level of the wastewater collection tank.

Although the invention was described with reference to the exemplary embodiments, various alterations and modifications may be performed without leaving the protective scope of the invention. The means of transportation having the toilet monument, which has a combined bidet and toilet system for a toilet in the means of transportation, can be implemented as a land vehicle, as an aircraft, such as an airplane or helicopter, and as a water or rail vehicle.

In addition, it is to be noted that "comprising" or "having" does not exclude other elements or steps and "a" or "one" does not exclude a plurality. In particular, the system can thus have, for example, more than one spray nozzle, more than one flow rate restrictor, more than one control unit, more than one wastewater collection tank, more than one flushing device for the toilet, more than one drainage device, more than one ventilation unit, more than one mechanical interface, more than one electrical interface, more than one heating unit, more than one mixing unit, and the means of transportation can have more than one toilet monument having more than one combined bidet and toilet system.

Furthermore, it is to be noted that features or steps which have been described with reference to one of the above exemplary embodiments may also be used in combination with other features or steps of other exemplary embodiments described above. Reference numerals in the claims are not to be viewed as a restriction. Moreover, while at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A combined bidet and toilet system for a toilet in a means of transportation, the system comprising:
    a predetermined quantity of fresh water on board the means of transportation;
    a wastewater collection tank that receives wastewater from the toilet;
    a spray nozzle that provides a water supply to clean a user on the toilet;
    a flow rate restrictor that regulates the water supply on a basis of a water flow rate through the spray nozzle; and
    a control unit that limits a number of uses or a frequency of uses of the spray nozzle by the user based on the predetermined quantity of fresh water on board the means of transportation,
    wherein the control unit regulates a function of the spray nozzle based on a fill level of the wastewater collection tank and in case of a high fill level in the wastewater collection tank a bidet function is deactivated without deactivation of a toilet function.

2. The system of claim 1, wherein the control unit is adapted for an independent control of a function of the spray nozzle and of a toilet function.

3. The system of claim 1, further comprising a flushing device for the toilet that automatically flushes in an event of a danger of an overflow of the toilet.

4. The system of claim 1, further comprising a drainage device that is adapted for self-draining.

5. The system of claim 4, wherein the system is adapted for self-draining by the drainage device by gravity.

6. The system of claim 1, further comprising a ventilation unit that is adapted for self-ventilation by the ventilation unit.

7. The system of claim 6, wherein the control unit is adapted for automatic initiation of ventilation by the ventilation unit.

8. The system of claim 1, wherein the spray nozzle is adapted for self-cleaning.

9. The system of claim 1, wherein the system is adapted for self-cleaning using a freshwater system.

10. The system of claim 1, further comprising:
a mechanical interface that is adapted for coupling the system to a washroom; and
an electrical interface that is adapted for coupling the system to the washroom.

11. The system of claim 1, the system further comprising:
a heating unit that heats a quantity of water of the water supply for the spray nozzle to a temperature of approximately 55° C. to approximately 65° C.; and
a mixing unit that supplies a specific quantity of water on the basis of the temperature of the quantity of water heated by the heating unit to produce a specific temperature for the water supply of the spray nozzle.

12. A means of transportation, comprising:
a predetermined quantity of fresh water on board the means of transportation;
a toilet monument disposed within the means of transportation;
a combined bidet and toilet system for use within the toilet monument, the combined bidet and toilet system for use within the toilet monument comprising:
a wastewater collection tank that receives wastewater from the toilet;
a spray nozzle that provides a water supply to clean a user on the toilet;
a flow rate restrictor that regulates the water supply on a basis of a water flow rate through the spray nozzle; and
a control unit that limits a number of uses or a frequency of uses of the spray nozzle by the user based on the predetermined quantity of fresh water on board the means of transportation,
wherein the control unit regulates a function of the spray nozzle based on a fill level of the wastewater collection tank and in case of a high fill level in the wastewater collection tank a bidet function is deactivated without deactivation of a toilet function.

13. The means of transportation of claim 12, wherein the means of transportation is an airplane.

14. A method for supplying a combined bidet and toilet system in a means of transportation with water and for removing wastewater from the system, the method comprising:
providing a predetermined quantity of fresh water on board the means of transportation;
providing a water supply for cleaning a user through a spray nozzle attached to the toilet;
regulating the water supply on a basis of a water flow rate through the spray nozzle by a flow rate restrictor;
limiting a number of uses or a frequency of uses of the spray nozzle by the user with a control unit based on the predetermined quantity of fresh water on board the means of transportation;
regulating a function of the spray nozzle with the control unit based on a fill level of a wastewater collection tank; and
deactivating a bidet function without deactivating a toilet function in case of a high fill level in the wastewater collection tank.

\* \* \* \* \*